United States Patent
Kondo et al.

(10) Patent No.: US 9,453,452 B2
(45) Date of Patent: Sep. 27, 2016

(54) MUFFLER

(71) Applicant: Futaba Industrial Co., Ltd., Aichi (JP)

(72) Inventors: Seiji Kondo, Aichi (JP); Masahiro Kajikawa, Aichi (JP); Masayuki Sudoh, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 14/423,911

(22) PCT Filed: Aug. 28, 2013

(86) PCT No.: PCT/JP2013/073031
§ 371 (c)(1),
(2) Date: Feb. 25, 2015

(87) PCT Pub. No.: WO2014/034731
PCT Pub. Date: Mar. 6, 2014

(65) Prior Publication Data
US 2015/0192055 A1 Jul. 9, 2015

(30) Foreign Application Priority Data

Aug. 31, 2012 (JP) .................................. 2012-192043

(51) Int. Cl.
*F01N 3/05* (2006.01)
*F01N 13/08* (2010.01)
(Continued)

(52) U.S. Cl.
CPC ............ *F01N 13/082* (2013.01); *F01N 1/084* (2013.01); *F01N 1/168* (2013.01); *F01N 3/005* (2013.01); *F01N 13/04* (2013.01); *F01N 2240/22* (2013.01); *F01N 2470/02* (2013.01); *F01N 2490/02* (2013.01); *Y02T 10/20* (2013.01)

(58) Field of Classification Search
CPC ...................................................... F01N 3/005
USPC .................... 181/244, 245, 227, 228, 212
See application file for complete search history.

(56) References Cited

U.S. PATENT DOCUMENTS 5,563,383 A    10/1996 Harwood
2009/0205326 A1*  8/2009 Watson .......................... 60/309
(Continued)

FOREIGN PATENT DOCUMENTS

DE    3241887 C1    7/1984
EP    0257236 A1    3/1988
(Continued)

OTHER PUBLICATIONS

Form PCT/IB/338 Notification of Transmittal of Copies of Translation of the International Report on Patentability in corresponding PCT Application (i.e., PCT/JP2013/073031), mailed Mar. 12, 2015 (1 page).
Form PCT/IB/373 International Preliminary Report on Patentability in corresponding PCT Application (i.e., PCT/JP2013/073031), issued Mar. 3, 2015 (1 page).
(Continued)

*Primary Examiner* — Forrest M Phillips
(74) *Attorney, Agent, or Firm* — Renner, Otto, Boisselle & Sklar, LLP

(57) ABSTRACT

A muffler comprises an outer shell, an outlet pipe, and a restraining mechanism. A restraining mechanism restrains a height of spout of a liquid that flows inside the outlet pipe through a designated vent hole, the designated vent hole is at least one vent hole facing against a bottom surface of the outer shell among the at least one vent hole that the outlet pipe comprises.

6 Claims, 10 Drawing Sheets

VIB-VIB cross section

(51) Int. Cl.
  *F01N 1/08* (2006.01)
  *F01N 3/00* (2006.01)
  *F01N 13/04* (2010.01)
  *F01N 1/16* (2006.01)

(56) References Cited

U.S. PATENT DOCUMENTS

| | | | | |
|---|---|---|---|---|
| 2010/0031645 | A1* | 2/2010 | Bidner et al. | 60/309 |
| 2011/0203692 | A1* | 8/2011 | Werni et al. | 138/37 |
| 2015/0060192 | A1* | 3/2015 | Wink et al. | 181/245 |

FOREIGN PATENT DOCUMENTS

| | | | |
|---|---|---|---|
| GB | 2134979 | A | 8/1984 |
| JP | H05-98958 | A | 4/1993 |
| JP | 199469313 | U | 9/1994 |
| JP | 2006-002612 | A | 1/2006 |
| JP | 2006-112327 | A | 4/2006 |
| JP | 2009-013902 | A | 1/2009 |
| JP | 2009-180138 | A | 8/2009 |
| JP | 2009180138 | A * | 8/2009 |
| JP | 2011-144690 | A | 7/2011 |

OTHER PUBLICATIONS

Form PCT/IB/237 Written Opinion of the International Searching Authority in corresponding PCT Application (i.e., PCT/JP2013/073031), mailed Nov. 19, 2013—Translation (5 pages).

Japanese Patent Office, International Search Report issued in corresponding International Application No. PCT/JP2013/073031 dated Nov. 19, 2013, 5 pp.

Canadian Patent Application No. 2,882,277, Office Action dated Jan. 13, 2016.

Extended European Search Report for corresponding European Application No. 13834229.0 dated Apr. 26, 2016.

Japanese Notice of Reason(s) for Rejection and English translation for corresponding Japanese Patent Application No. 2012-192043 mailed on Aug. 2, 2016.

Chinese First Office Action and English translation for corresponding Chinese Patent Application No. 201380045189X mailed on Jul. 11, 2016.

Japanese Notice of Reason(s) for Rejection for corresponding Japanese Patent Application. English translation and mailing to follow.

* cited by examiner

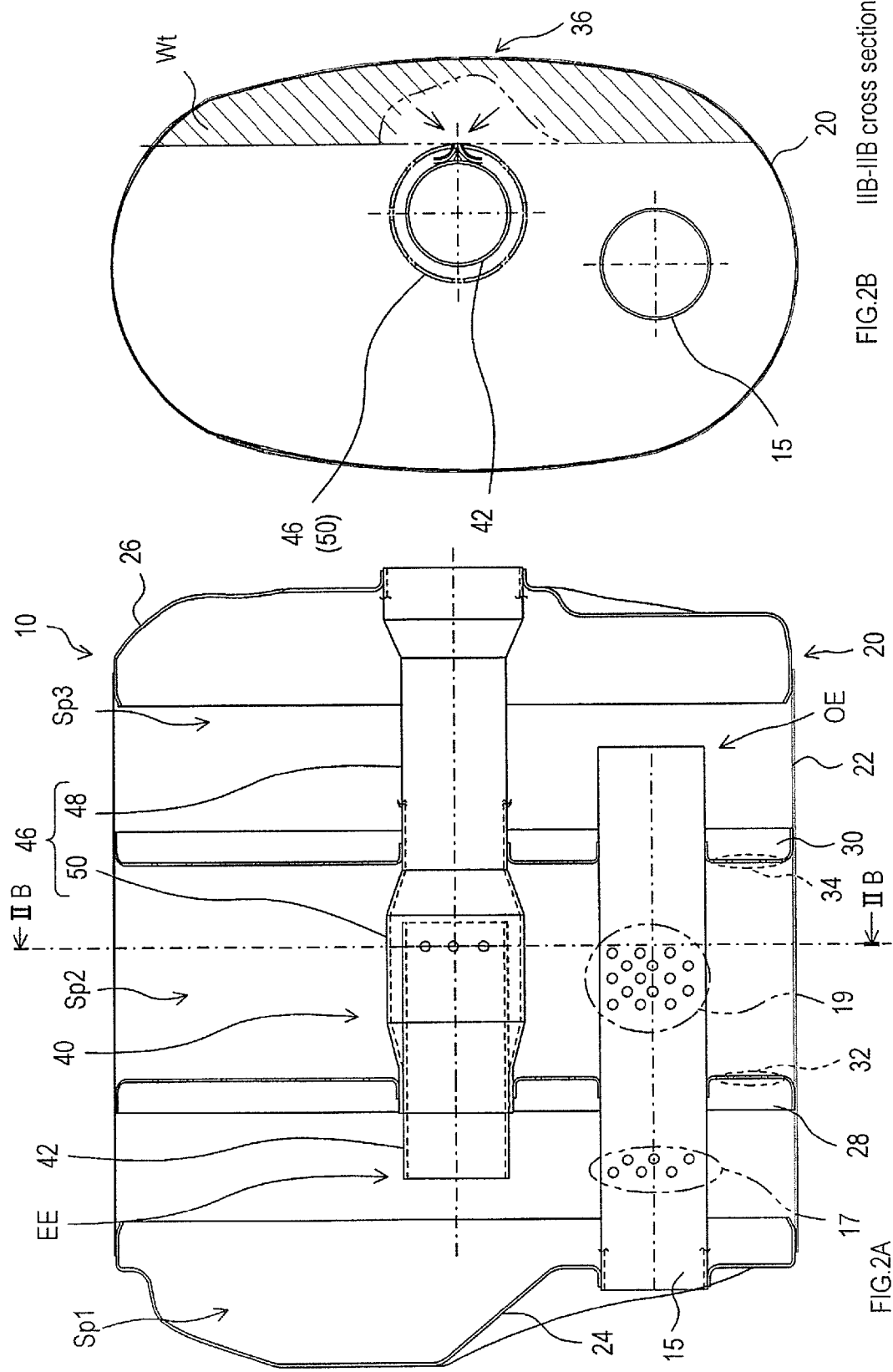

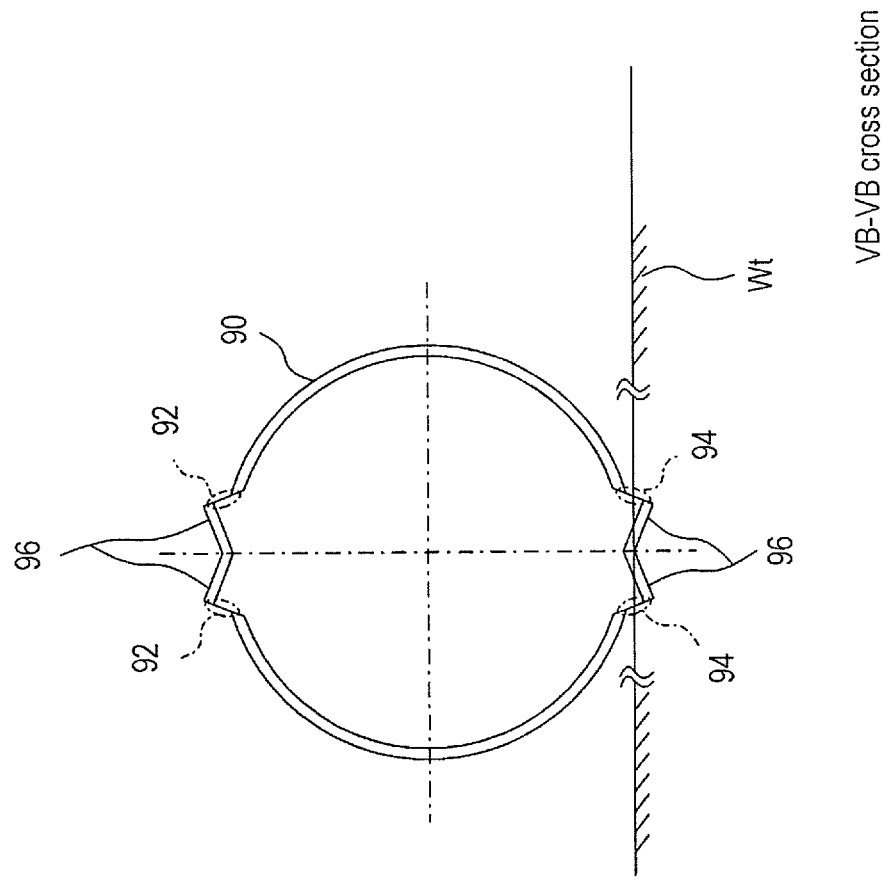
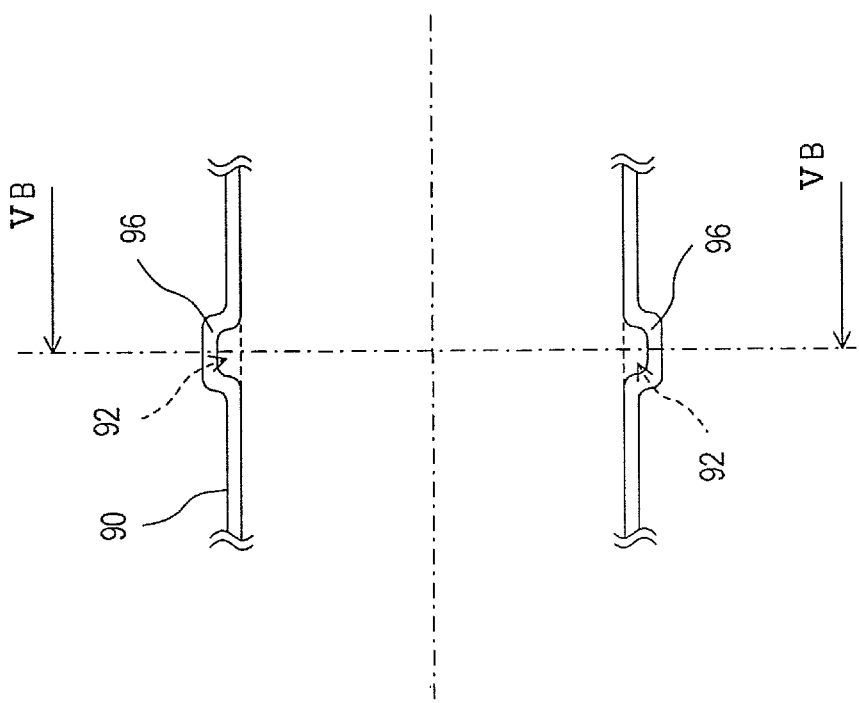
FIG.5B
FIG.5A

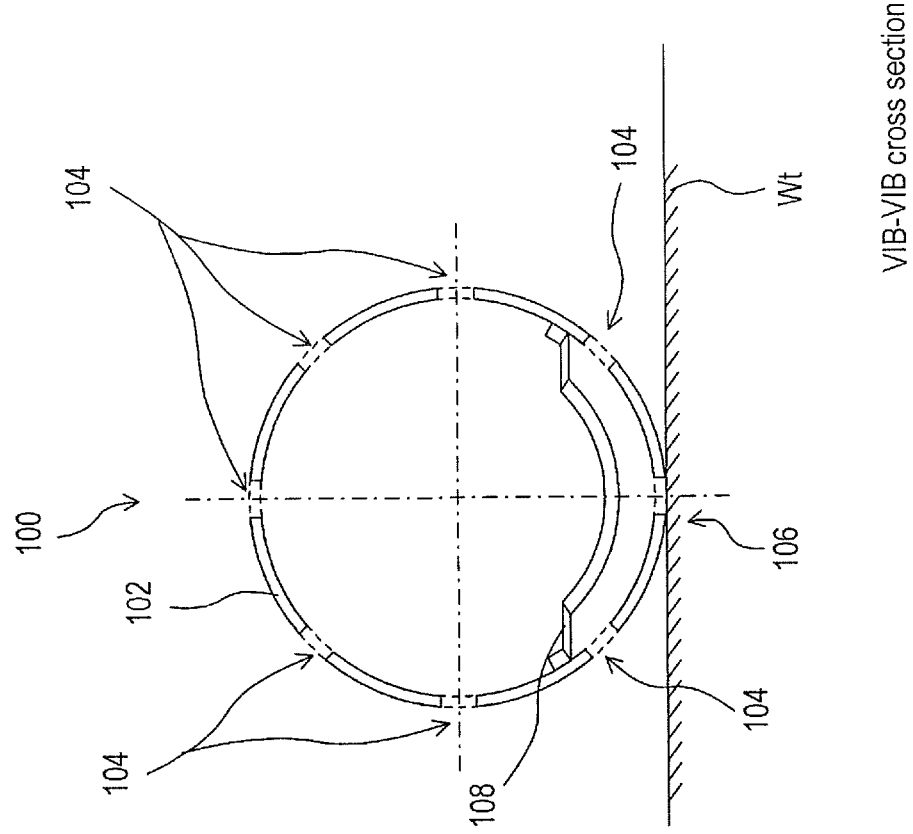
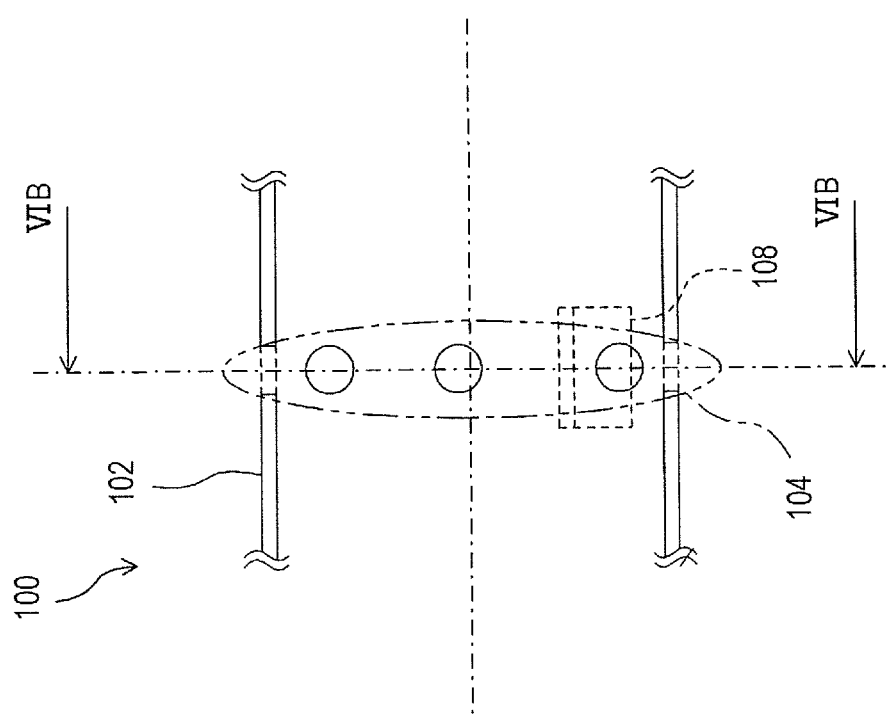
FIG.6B
FIG.6A

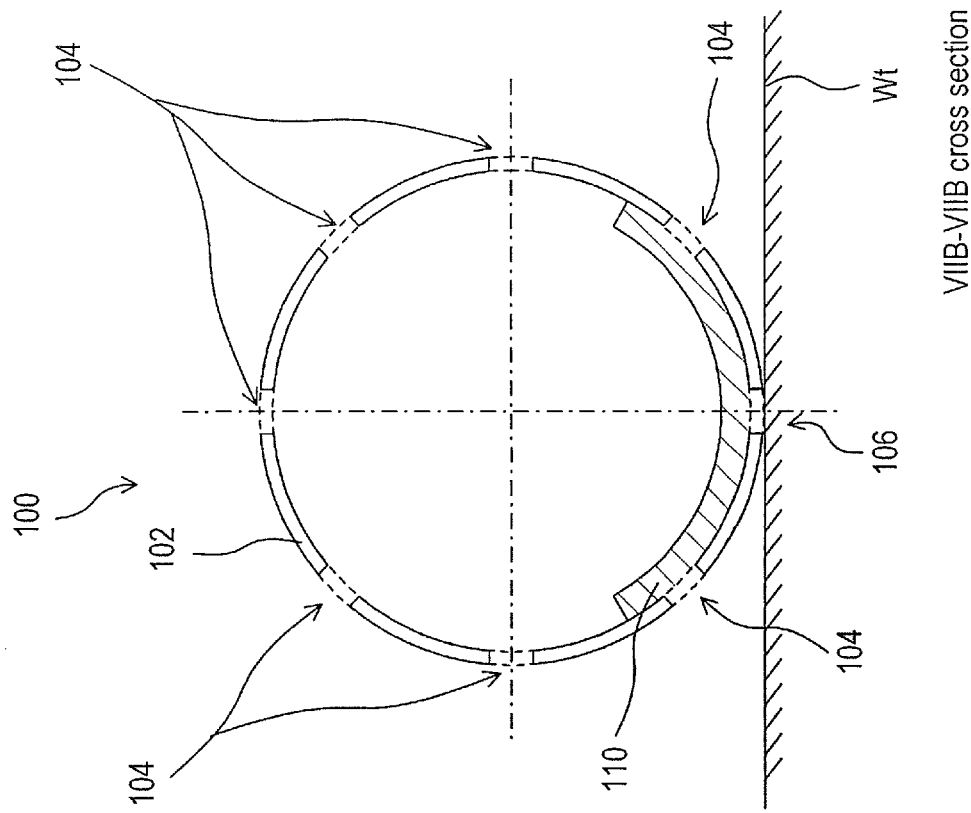
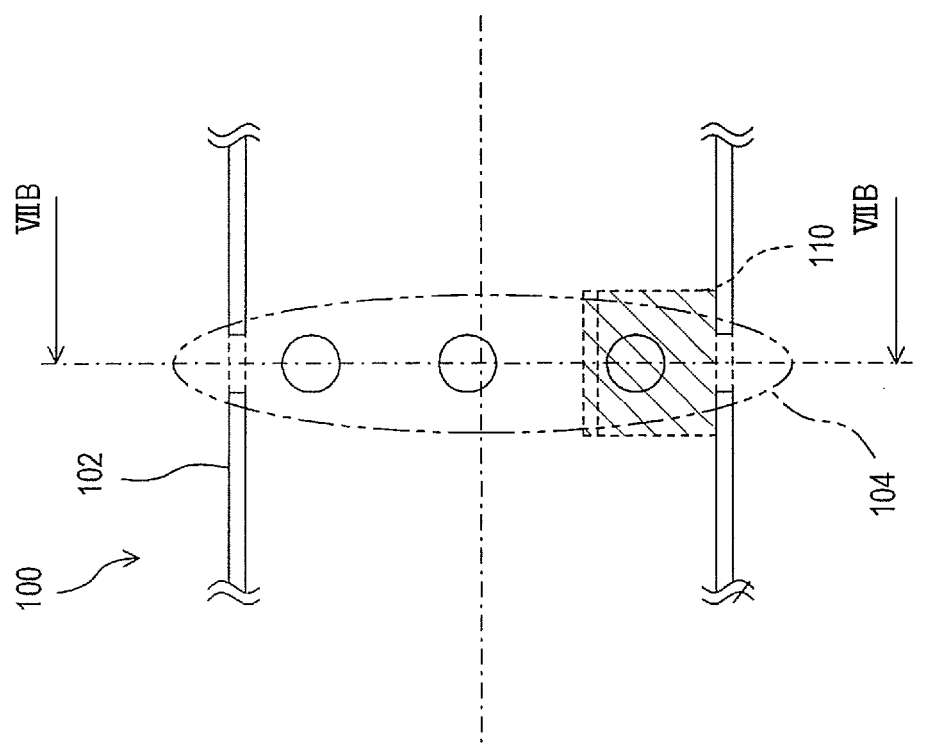
FIG.7B
FIG.7A

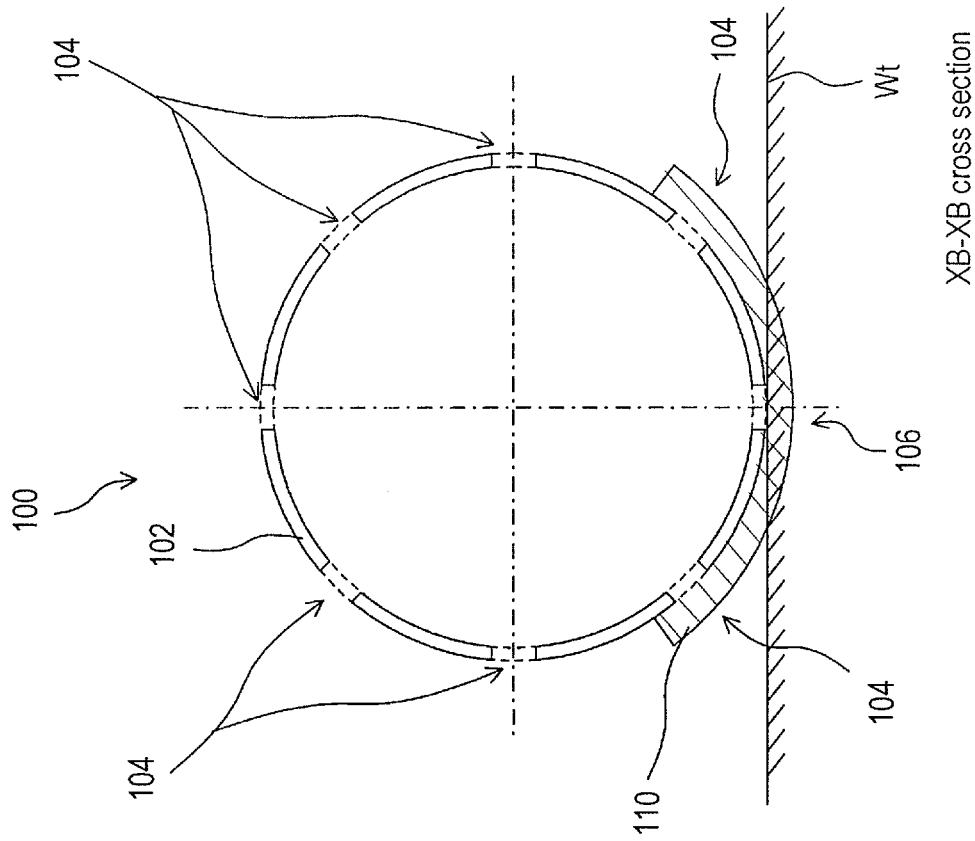
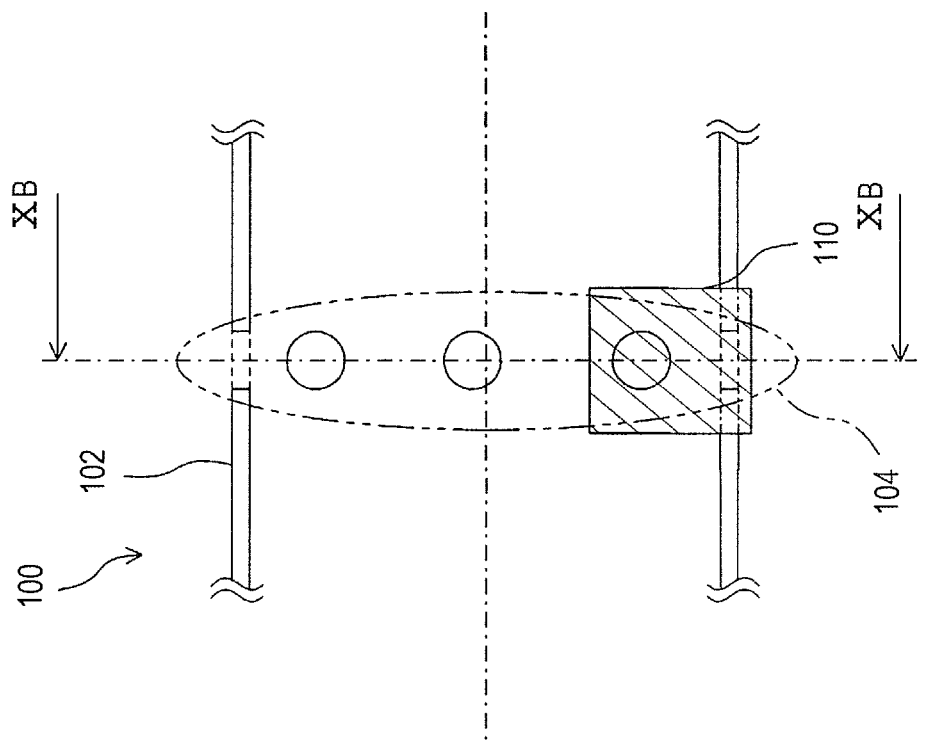
FIG.10A
FIG.10B
XB-XB cross section

MUFFLER

CROSS-REFERENCE TO RELATED APPLICATIONS

This international application claims the benefit of Japanese Patent Application No. 2012-192043 filed Aug. 31, 2012 in the Japan Patent Office, and the entire disclosure of Japanese Patent Application No. 2012-192043 is incorporated herein by reference.

TECHNICAL FIELD

The present invention relates to a muffler that configures an exhaust system.

BACKGROUND ART

A muffler that configures an exhaust system installed in an automobile is conventionally known (see Patent Document 1).

As illustrated in FIG. 8A, this type of muffler 200 is provided with an outer shell 202, an inlet pipe 204 to let exhaust gases from an internal combustion engine flow into the outer shell 202, and an outlet pipe 206 to guide the exhaust gases in the outer shell 202 to the atmosphere. The outlet pipe 206 is a tubular member containing multiple holes 208 (hereinafter referred to as exhaust-gas inlet holes) drilled therein in the circumferential direction, and is arranged such that the exhaust-gas inlet holes 208 are arranged inside the outer shell 202. The outlet pipe 206 has to be arranged inside the outer shell 202 such that at least one of the exhaust-gas inlet holes 208 faces against the bottom surface of the outer shell 202. The exhaust-gas inlet hole 208 that is arranged so as to face towards the bottom surface of the outer shell 202 is hereinafter referred to as a designated inlet hole 210 (see FIG. 9).

Generally, the exhaust gases from the internal combustion engine flow into the outer shell 202 through the inlet pipe 204. The exhaust gases in the outer shell 202 flow into the outlet pipe 206 from an opening arranged at one end of the outlet pipe 206 and the exhaust-gas inlet holes 208, and are discharged to the atmosphere.

Generally, when the exhaust gases flow into the outer shell 202, water condenses from the exhaust gases and water Wt pools on the bottom part of the outer shell 202 in such muffler 200 (see FIG. 8B).

FIG. 8A is a diagram to illustrate an inner structure of a conventional muffler; FIG. 8B is a VIIIB-VIIIB cross-sectional view of FIG. 8A. FIG. 9 is an enlarged view of an outlet pipe illustrated in FIG. 8B The water Wt pooled inside the outer shell 202 is discharged to the atmosphere when the internal combustion engine rotates at a high rotational frequency, for example, at 700 rpm or higher, and the flow of the exhaust gases inside an outlet pipe 206 is accelerated. More specifically, when the flow of the exhaust gases becomes faster, pressure inside the outer shell 202 becomes negative; thereby the water Wt flows into the outlet pipe 206 and is discharged to the atmosphere through multiple holes drilled in the outlet pipe 206.

PRIOR ART DOCUMENTS

Patent Documents

Patent Document 1: Japanese Unexamined Patent Application Publication No. 2006-002612

SUMMARY OF THE INVENTION

Problems to be Solved by the Invention

However, when the water Wt pooled inside the outer shell 202 flows into the outlet pipe 206, an elevation head h becomes large in the conventional muffler 200 (see FIG. 9).

If the elevation head h becomes high as described above, there arises a problem that the abnormal noise tends to become loud; the abnormal noise is generated when the water Wt spouted into the outlet pipe 206 hits an inner circumferential wall of the outlet pipe 206 and the water Wt inside the outlet pipe 206

Thus, in one aspect of the present invention, it is favorable to reduce the volume of the abnormal noise when water flows into the outlet pipe in the muffler.

Means for Solving the Problems

One aspect of the present invention is related to a muffler provided with an outer shell and an outlet pipe. Exhaust gases from an internal combustion engine flow into the outer shell. The outlet pipe is formed into a tubular shape containing a pair of open end-parts and is provided with at least one vent hole that passes through an outer surface and an inner surface thereof. In this outlet pipe, one of the pair of open end-parts and the vent hole are arranged inside the outer shell so as to guide the exhaust gases in the outer shell to the atmosphere.

The muffler according to one aspect of the present invention is further provided with a restraining mechanism. This restraining mechanism is a mechanism to restrain liquid that flows into the outlet pipe through a designated vent hole. The designated vent hole is at least one vent hole that faces against the bottom surface of the outer shell, among at least one vent hole the outlet pipe is provided with.

When the pressure inside the outlet pipe is negative, the liquid that flows into the outlet pipe can be reduced, and consequently, a height of spout of the water can be reduced with such muffler. Thereby, the elevation head of the liquid that flows into the outlet pipe can be decreased according to the muffler of the present invention; as a consequence, the volume of abnormal noise when water flows into the outlet pipe can be minimized according to the muffler in one aspect of the present invention.

In addition, the restraining mechanism in one aspect of the present invention may be provided with a cover member that covers the designated vent hole from inside of the outlet pipe.

The designated vent hole can be covered from inside of the outlet pipe according to such restraining mechanism. Thereby, the elevation head of the liquid that flows into the outlet pipe can be decreased.

The cover member in one aspect of the present invention may also be a pipe, or a member formed into a plate-like shape, as long as the member is inserted inside the outlet pipe.

The restraining mechanism in one aspect of the present invention can certainly be established with those cover members.

The cover member in one aspect of the present invention may also be a member made of an air-permeable material.

According to such cover member, the elevation head of the liquid that flows into the outlet pipe can be decreased while maintaining the exhaust performance of the muffler, to which one aspect of the present invention is applied.

The restraining mechanism in one aspect of the present invention may be configured with a piece member that protrudes from the surrounding edge of the designated vent hole so as to cover each designated vent hole from outside of the outlet pipe, or may be made of the air-permeable material and configured by covering the designated vent hole from outside of the outlet pipe.

With the above restraining mechanism, the elevation head of the liquid that flows into the outlet pipe can be decreased while maintaining the exhaust performance of the muffler, to which one aspect of the present invention is applied.

BRIEF DESCRIPTION OF THE DRAWINGS

FIG. 2A is a diagram illustrating an inner configuration of a main muffler; FIG. 2B is a IIB-IIB cross-sectional view of FIG. 2A.

FIG. 5A is a partially enlarged view of the outlet pipe in Third Embodiment; FIG. 5B is a VB-VB cross-sectional view of FIG. 5A.

FIG. 6A is a partially enlarged view of the outlet pipe in Fourth Embodiment; FIG. 6B is a VIB-VIB cross-sectional view of FIG. 6A.

FIG. 7A is a partially enlarged view of the outlet pipe in Fifth Embodiment; FIG. 7B is a VIIB-VIIB cross-sectional view of FIG. 7A.

FIG. 10A is a partially enlarged view of the outlet pipe in a variation; FIG. 10B is a XB-XB cross-sectional view of FIG. 10A.

EXPLANATION OF REFERENCE NUMERALS

1 . . . exhaust system, 3 . . . catalyst converter, 5 . . . sub-muffler, 7 . . . exhaust pipe, 10 . . . main muffler, 15 . . . inlet pipe, 20 . . . outer shell, 36 . . . bottom surface, 40,70,90,100 . . . outlet pipe, 42,72 . . . first pipe, 46,78 . . . second pipe, 48 . . . straight-part, 50 . . . expanded-diameter part, 52,80,92,104 . . . vent hole, 54,82, 94,106 . . . designated vent hole, 74 . . . inlet-part, 76 . . . contracted-diameter part, 96 . . . piece member, 102 . . . pipe member, 108,110 . . . cover member, 150 . . . internal combustion engine

MODE FOR CARRYING OUT THE INVENTION

Hereinafter, embodiments for carrying out the present invention are described with reference to the drawings.

First Embodiment

<Exhaust System>

Figure 1:
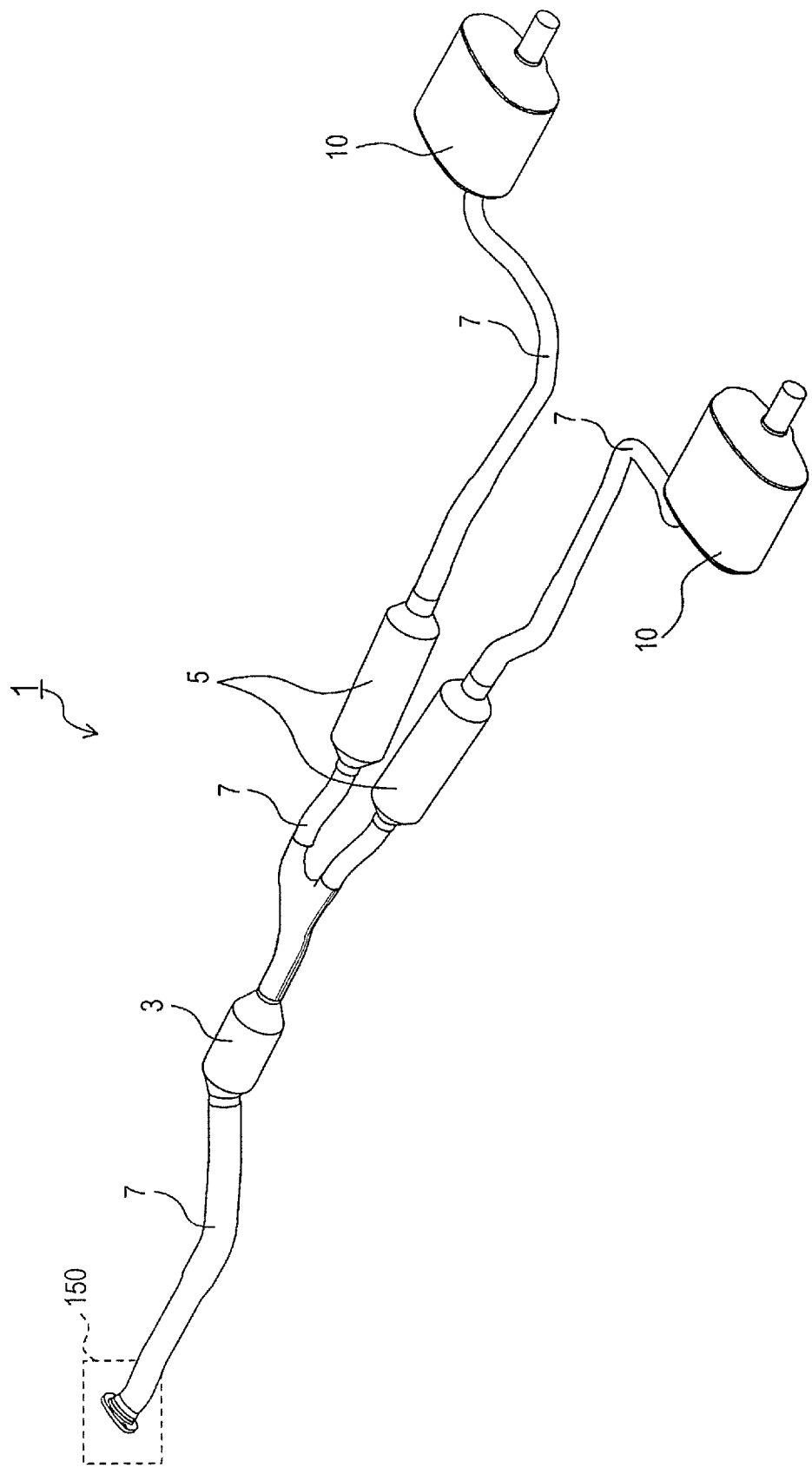
FIG. 1 is a perspective view illustrating an exhaust system provided with a muffler, to which one aspect of the present invention is applied.

An exhaust system 1 illustrated in FIG. 1 is installed in an automobile for use, and guides exhaust gases discharged from an internal combustion engine 150 of a vehicle to the atmosphere outside the vehicle. In the embodiments, the automobile in which the exhaust system 1 is installed is referred to as the vehicle.

This exhaust system 1 is provided with a catalyst converter 3, two sub-mufflers 5, two main mufflers 10, and multiple (four in this embodiment) exhaust pipes 7. In other words, the exhaust system 1 is a so-called dual-exhaust system.

The catalyst converter 3 is a known device to purify the exhaust gases from the internal combustion engine 150. The main mufflers 10 and the sub-mufflers 5 are devices to reduce exhaust noise.

The exhaust pipes 7 are known tubular members that couple each part configuring the exhaust system 1. In the present embodiment, an exhaust manifold (unillustrated) coupled to the internal combustion engine 150 and the catalyst converter 3; the catalyst converter 3 and the sub-mufflers 5; and the sub-mufflers 5 and the main mufflers 10 are each coupled with the exhaust pipes 7.

<Main Muffler>

As illustrated in FIG. 2A and FIG. 2B, the main muffler 10 is provided with an inlet pipe 15, an outer shell 20, and an outlet pipe 40.

The inlet pipe 15 lets the exhaust gases from the internal combustion engine 150 flow into the outer shell 20. This inlet pipe 15 is formed into a tubular shape containing a pair of open end-parts. One open end (hereinafter referred to as inlet end) of this inlet pipe 15 is coupled to the exhaust manifold that is coupled to the internal combustion engine 150.

The inlet pipe 15 in the present embodiment contains multiple through holes 17 and 19 that pass through the outer surface and the inner surface thereof.

The outer shell 20 is provided with a cylindrical tubular part 22 and sidewall parts 24 and 26 that occlude both ends of the tubular part 22, and includes an inside space therein. Two partition walls 28 and 30 are disposed inside the outer shell 20 so as to partition the inside space into three spaces.

Hereinafter, the space partitioned by the tubular part 22, the sidewall part 24, and the partition wall 28 is referred to as a first expansion chamber Sp1; the space partitioned by the tubular part 22, the partition wall 28, and the partition wall 30 is referred to as a second expansion chamber Sp2; and the space partitioned by the tubular part 22, the partition wall 30, and the sidewall part 26 is referred to as a third expansion chamber Sp3.

An end part (hereinafter referred to as outlet end) OE, opposite the inlet end of the inlet pipe 15, is arranged in the outer shell 20 such that the exhaust gases from the internal combustion engine 150 flow into the outer shell 20. The outlet end OE of the inlet pipe 15 is inserted from the sidewall part 24 of the outer shell 20 and passes through the first expansion chamber Sp1, the partition wall 28, the second expansion chamber Sp2, and the partition wall 30, and is arranged inside the third expansion chamber Sp3. The inlet pipe 15 is further arranged such that the through holes 17 are located in the first expansion chamber Sp1 of the outer shell 20 and the through holes 19 are located in the second expansion chamber Sp2.

In the two partition walls 28 and 30, multiple through holes 32 and 34 that respectively pass through the partition walls 28 and 30 are arranged. In other words, the outer shell 20 is formed such that gas (the exhaust gases) can circulate between the first expansion chamber Sp1, the second expansion chamber Sp2, and the third expansion chamber Sp3.

<Outlet Pipe>

Next is an explanation of the outlet pipe 40 that is a main part of the present invention.

The outlet pipe 40 is a member to guide the exhaust gases that flow into the outer shell 20 from the internal combustion engine 150 to the atmosphere outside the vehicle, and is a member formed into a cylindrical shape containing a pair of open end-parts as a whole. One of the pair of open end-parts of this outlet pipe 40 is located in the outer shell 20 such that the exhaust gases flow into the outlet pipe 40. The pair of open end-parts of the outlet pipe 40 located in the outer shell 20 is hereinafter referred to as exhaust-gas inlet ends EE.

The outlet pipe 40 is provided with a first pipe 42 and a second pipe 46.

The first pipe 42 is a member containing a pair of open end-parts and is formed into a cylindrical shape.

One of the pair of open end-part of the first pipe 42 is arranged in the first expansion chamber Sp1 of the outer shell 20 to function as the exhaust-gas inlet end EE.

The second pipe 46 is provided with a straight-part 48 and an expanded-diameter part 50, and is a member wherein the straight-part 48 and the expanded-diameter part 50 are integrally formed into a cylindrical shape containing a pair of open end-parts as a whole.

The straight-part 48 is a member containing a pair of open end-parts and being formed into a cylindrical shape. One end of the pair of open end-parts of the straight-part 48 is coupled to a tail pipe that guides the exhaust gases to the atmosphere outside the vehicle.

The expanded-diameter part 50 is a member containing a pair of open end-parts and being formed into a cylindrical shape with a diameter larger than the diameter of the first pipe 42 and the diameter of the straight-part 48 as a whole.

One of the pair of open end-parts of the expanded-diameter part 50 is coupled to an end part, unconnected to the tail pipe, of the straight-part 48. In addition, the other end of the pair of open end-parts of the expanded-diameter part 50, in other words, an end part, unconnected to the straight-part 48, of the expanded-diameter part 50 is coupled to the outer circumference of the first pipe 42.

The expanded-diameter part 50 contains multiple holes 52 that pass through the outer surface and the inner surface thereof along the outer circumference. Eight vent holes 52 are arranged in the present embodiment.

Among the pair of open end-parts of the first pipe 42, an end part (hereinafter referred to as main body connecting-end) BE, opposite the exhaust-gas inlet end EE, is arranged to be located in the expanded-diameter part 50 of the second pipe 46. This position of the main body connecting-end BE is arranged so as to cover the designated vent hole 54 among the vent holes 52, and retain a space between the expanded-diameter part 50 as well as the straight-part 48 of the second pipe 46 and the inner surfaces of each. The designated vent hole 54 mentioned here is at least one vent hole 52 that faces towards the bottom surface 36 of the outer shell 20 (see FIG. 2B).

More specifically, the outlet pipe 40 is formed into a double-tube wherein the first pipe 42 is disposed inside the second pipe 46 at least in a part where the vent holes 52 are arranged.

[Functions and Effects of Muffler in Embodiments]

Next is an explanation of functions and effects of the main muffler 10.

The exhaust gases discharged from the internal combustion engine 150 circulate inside the inlet pipe 15 and flow into the outer shell 20 from the through holes 17 and 19 of the inlet pipe 15 and from an opening of the outlet end OE.

The exhaust gases, which have flowed into the outer shell 20, flow into the outlet pipe 40 from an opening of the exhaust-gas inlet end EE and the vent holes 52 of the outlet pipe 40 to be discharged to the atmosphere outside the vehicle.

In the outer shell 20, in which the exhaust gases have flowed, the water condenses from the exhaust gases and the water Wt pools on the bottom part of the outer shell 20.

When the rotational frequency of the internal combustion engine 150 increases (for example, to 700 [rpm] or higher) and the flow amount of the exhaust gases increases, flow of the exhaust gases that circulate inside the outlet pipe 40 is accelerated. In this state, pressure inside the outlet pipe 40 becomes negative; thereby the water Wt pooled on the bottom part of the outer shell 20 is taken up inside the outlet pipe 40.

Then the water Wt, taken up inside the outlet pipe 40, is discharged to the atmosphere outside the vehicle along with the exhaust gases.

The first pipe 42 of the outlet pipe 40 is arranged so as to retain a space from the inner surfaces of the expanded-diameter part 50 and the straight-part 48 of the second pipe 46 and to cover the designated vent hole 54. In other words, the first pipe 42 functions as a restraining mechanism in the present embodiment.

In the present embodiment, the space between the first pipe 42 and each inner surface of the expanded-diameter part 50 and the straight-part 48 of the second pipe 46 is set shorter than the height of the elevation head of the water Wt spouted into the outlet pipe 40. The height of the elevation head is the highest point of the water Wt spouted into the outlet pipe 40 measured from the surface of the water Wt pooled inside the outer shell 20.

Thus, when the pressure inside the outlet pipe 40 becomes negative, liquid that flows into the outlet pipe 40, i.e., the water Wt that is spouted into the outlet pipe 40, hits the first pipe 42 according to the main muffler 10. Thereby, the hydraulic head (the elevation head) h of the water Wt that flows into the outlet pipe 40 can be decreased according to the main muffler 10.

As a result, the volume of the abnormal noise when the water Wt flows into the outlet pipe 40 from the outer shell 20 can be minimized according to the main muffler 10.

Second Embodiment

A main muffler in the Second Embodiment is different from the main muffler 10 in the First Embodiment in structures of the outlet pipe. Thus, in the present embodiment, configurations the same as the First Embodiment will be marked with the same reference numerals to omit explanations, and the structures of the outlet pipe different from the First Embodiment will be mainly explained.

Figure 4B:
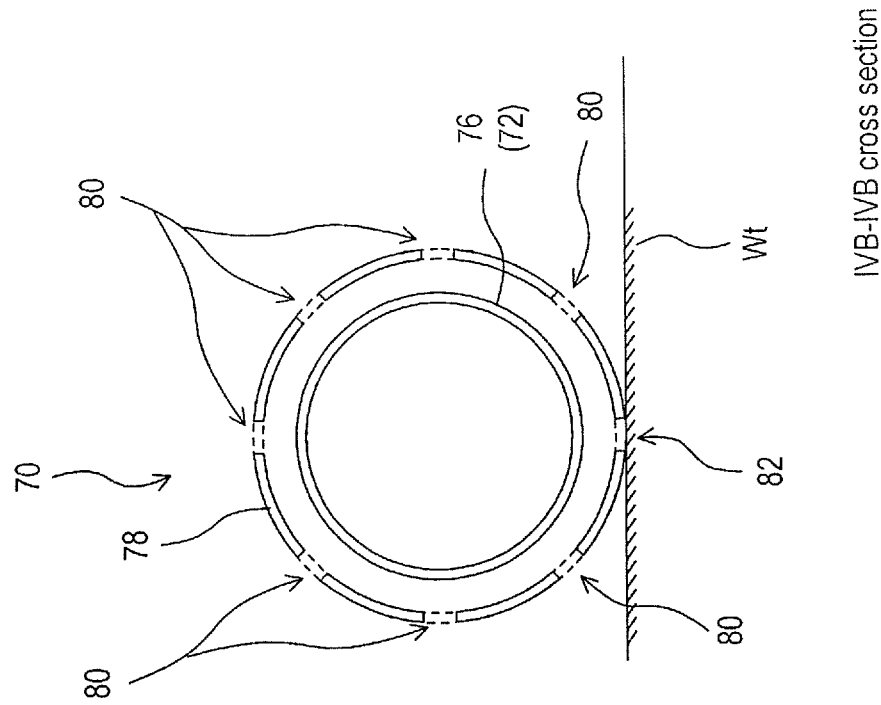
FIG. 4B is a IVB-IVB cross-sectional view of FIG. 4A.
Figure 4A:
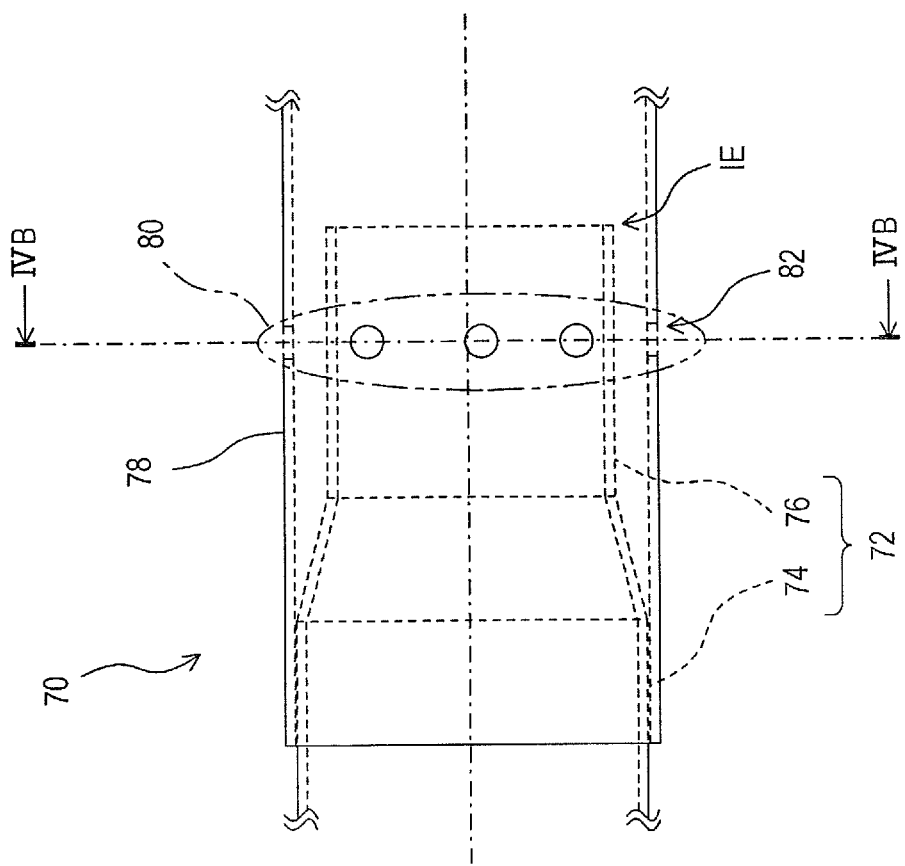
FIG. 4A is a partially enlarged view of an outlet pipe in Second Embodiment.
Figure 8B:
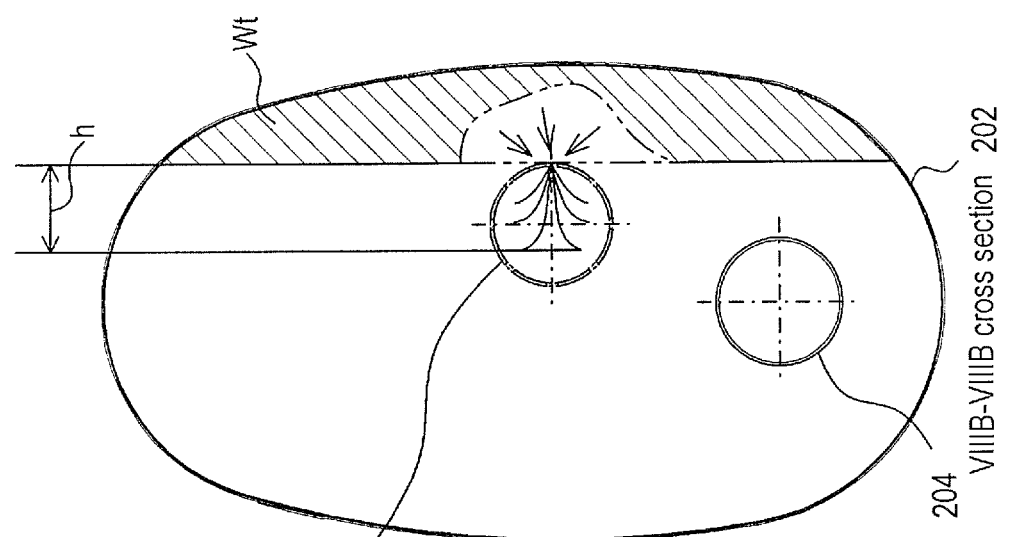
FIG. 8B is a VIIIB-VIIIB cross-sectional view of FIG. 8A.
Figure 8A:
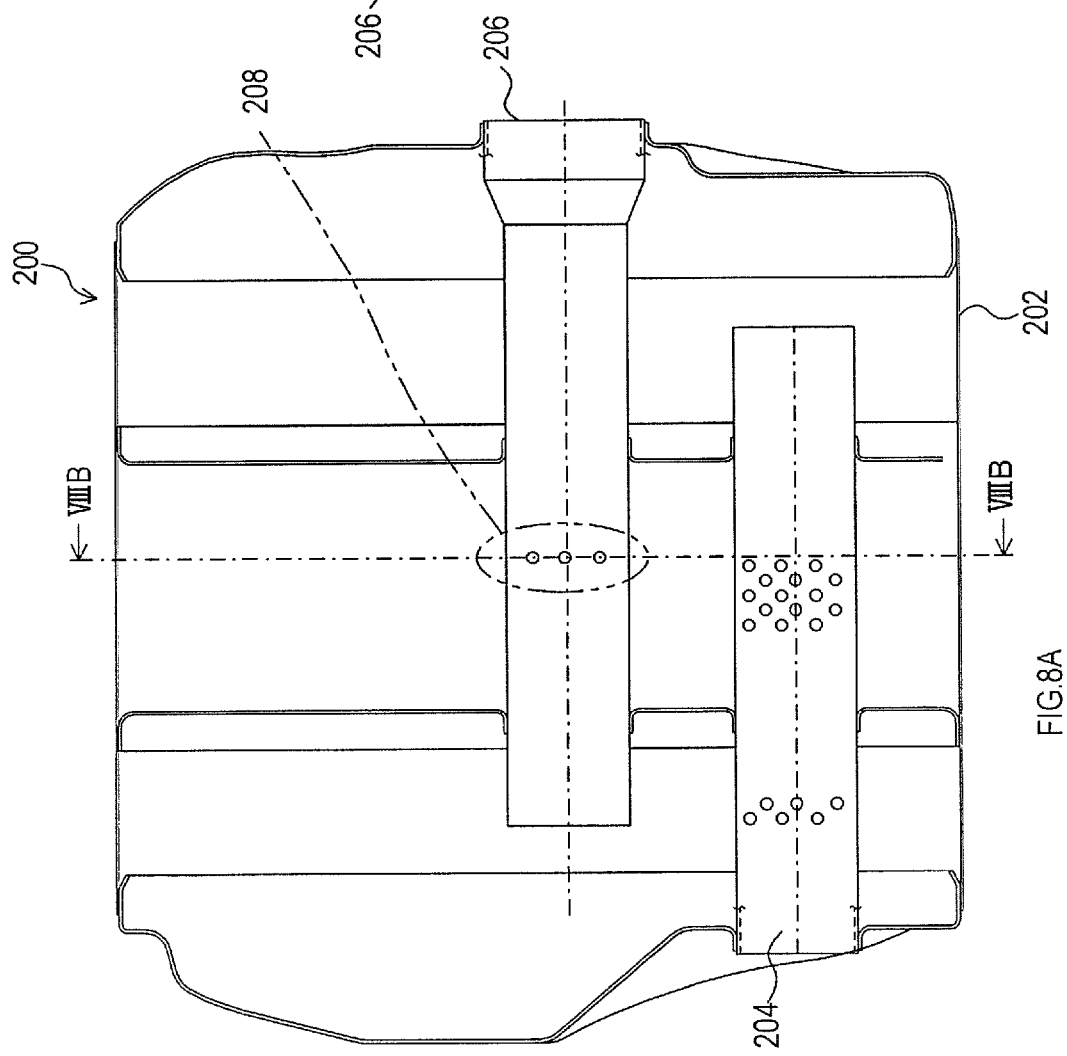
FIG. 8A is a diagram illustrating an inner structure of a conventional muffler.
Figure 9:
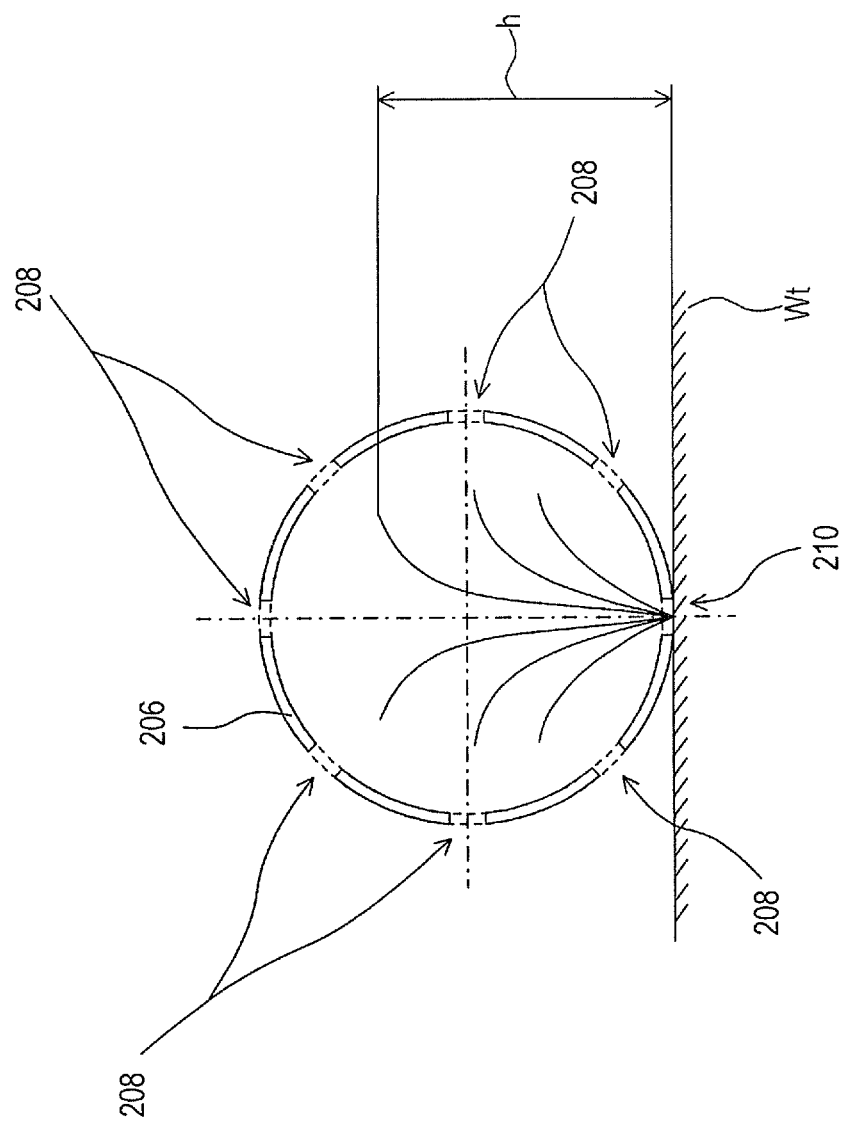
FIG. 9 is an enlarged view of the outlet pipe illustrated in FIG. 8B.

The main muffler 10 in the present embodiment is provided with the inlet pipe 15, the outer shell 20, and an outlet pipe 70 (see FIG. 4A and FIG. 4B).

Figures 3A, 3B:
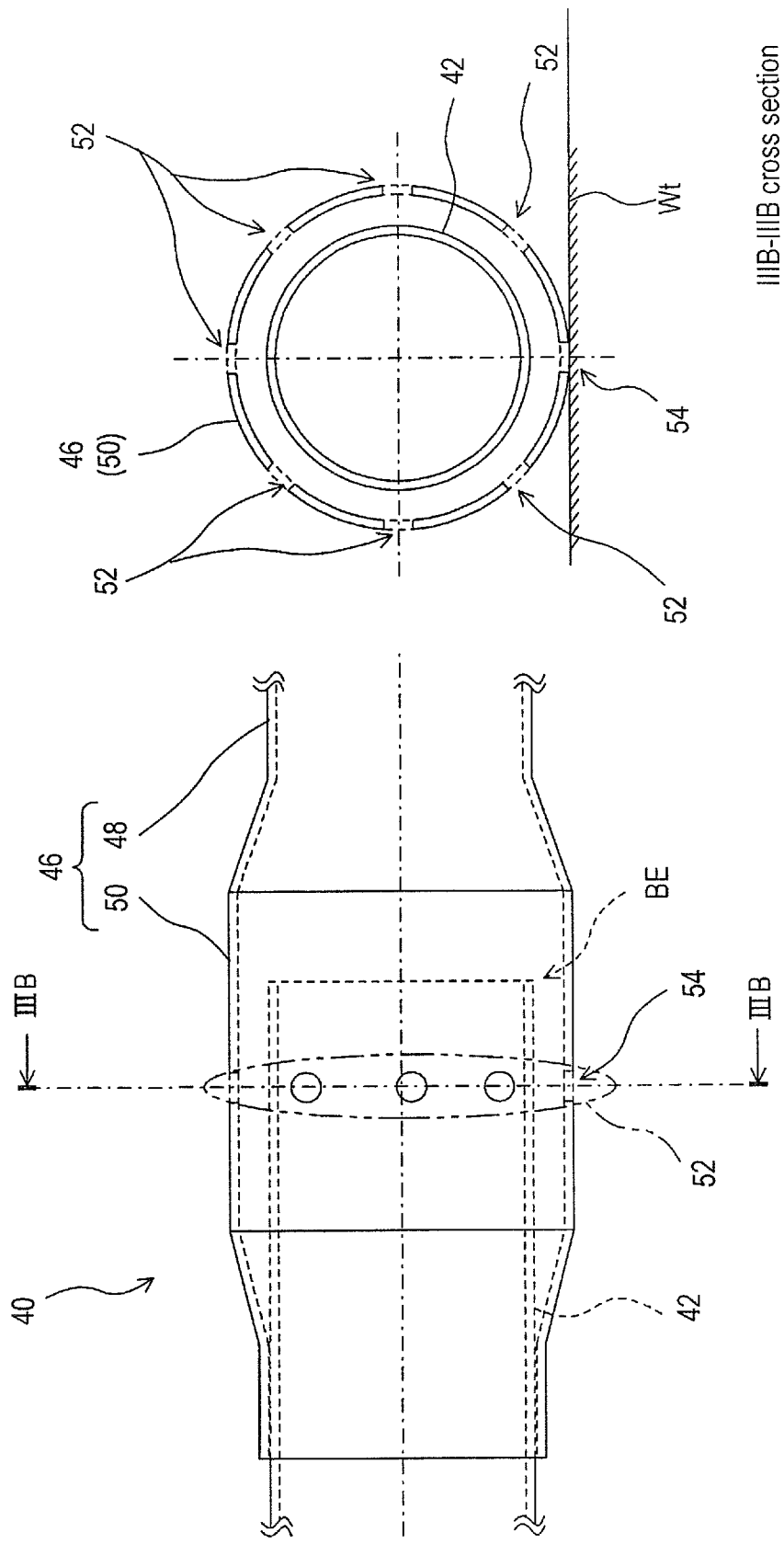
FIG. 3A is an explanatory drawing with an enlarged view of a main substance of an invention in an outlet pipe.
FIG. 3B is a IIIB-IIIB cross-sectional view of FIG. 3A.

As illustrated in FIG. 4A and FIG. 4B, the outlet pipe 70 in the present embodiment is provided with a first pipe 72 and a second pipe 78. FIG. 4A is a diagram illustrating a main substance of an invention of the present embodiment, similarly as FIG. 3A, referenced in First Embodiment.

The first pipe 72 is provided with an inlet-part 74 and a contracted-diameter part 76; the inlet-part 74 and the contracted-diameter part 76 are integrally formed into a cylindrical shape containing a pair of open end-parts as a whole.

The inlet-part 74 is a member containing a pair of open end-parts and being formed into a cylindrical shape. One of the pair of open end-parts of the inlet-part 74 is disposed to the first expansion chamber Sp1 of the outer shell 20 to function as the exhaust-gas inlet end EE.

The contracted-diameter part 76 is a member containing a pair of open end-parts and being formed into a cylindrical shape with a diameter smaller than the diameter of the second pipe 78 (thus, smaller than the diameter of the inlet-part 74). One of the pair of open end-parts of the contracted-diameter part 76 is connected to an end part, opposite the exhaust-gas inlet end EE, of the inlet-part 74.

The second pipe 78 is a member containing a pair of open end-parts and being formed into a cylindrical shape. One of the pair of open end-parts of the second pipe 78 (hereinafter referred to as open-end to atmosphere) is coupled to a tail pipe that guides the exhaust gases to the atmosphere outside the vehicle. An end part, opposite the open-end to atmosphere, of the second pipe 78 is connected to the inlet-part 74 of the first pipe 72.

The second pipe 78 contains multiple vent holes 80 that pass through the outer surface and the inner surface thereof along the outer circumference. Eight vent holes 80 are arranged in the present embodiment.

In the contracted-diameter part 76 of the first pipe 72, an end part (hereinafter referred to as inner end) IE that is not connected to the inlet-part 74 is arranged to be located inside the second pipe 78. This position of the inner end IE is set so as to cover a designated vent hole 82 among the vent holes 80, and to retain a space from an inner surface of the second pipe 78. The designated vent hole 82 mentioned here is at least one vent hole 80 that faces against the bottom surface 36 of the outer shell 20.

In other words, the outlet pipe 70 is formed into a double-tube wherein the contracted-diameter part 76 of the first pipe 72 is disposed inside the second pipe 78 at least in a part where the vent holes 80 are arranged. In other words, the contracted-diameter part 76 of the first pipe 72 functions as the restraining mechanism in the present embodiment.

In the present embodiment, the space between the inner end IE and the inner surface of the second pipe 78 is set shorter than the height of the elevation head of the water Wt spouted into the outlet pipe 40.

Effects of Second Embodiment

The same effects as the outlet pipe 40 in the First Embodiment can be attained by the outlet pipe 70 in the present embodiment.

Third Embodiment

A main muffler in the Third Embodiment is different from the main muffler 10 in the First Embodiment in structures of the outlet pipe. Thus, in the present embodiment, configurations the same as the First Embodiment will be marked with the same reference numerals to omit explanations, and the structures of the outlet pipe different from the First Embodiment will be mainly explained.

The main muffler 10 in the present embodiment is provided with the inlet pipe 15, the outer shell 20, and the outlet pipe 90 (see FIG. 5A and FIG. 5B).

As illustrated in FIG. 5A and FIG. 5B, the outlet pipe 90 in the present embodiment is a member formed into a cylindrical shape containing a pair of open end-parts. FIG. 5A is a diagram illustrating a main substance of an invention in the present embodiment likewise FIG. 3A referenced in the First Embodiment.

One of the pair of open end-parts of the outlet pipe 90 (hereinafter referred to as open-end to atmosphere) is coupled to the tail pipe that guides the exhaust gases to the atmosphere outside the vehicle. An end part, opposite the open-end to atmosphere, of the outlet pipe 90 is disposed to the first expansion chamber Sp1 of the outer shell 20 to function as the exhaust-gas inlet end EE.

The outlet pipe 90 is provided with multiple vent holes 92 that pass the outer surface and the inner surface thereof along the outer circumference. Four vent holes 92 are arranged in the present embodiment.

The outlet pipe 90 is further provided with piece members 96 that protrude horizontally from edges of the vent holes 92 so as to cover at least a part of each vent hole 92 from outside of the outlet pipe 90.

Each piece member 96 may be formed by, for example, notching a part of the outlet pipe 90 into a rectangular shape, leaving one side connected, and peeling the notched part up around the side connected to the outlet pipe 90 as an axis.

Among the multiple vent holes 92, two vent holes 92 that face against the bottom surface 36 of the outer shell 20 are designated vent holes 94 in the present embodiment.

Effects of Third Embodiment

In the outlet pipe 90 as described above, the inflow angle of the water Wt that flows into the outlet pipe 90 by the piece members 96 is approximately horizontal. In other words, the piece members 96 function as the restraining mechanism in the present embodiment.

More specifically, because the water Wt that flows into the outlet pipe 90 spouts horizontally in the outlet pipe 90, it is also possible in the outlet pipe 90 to decrease the hydraulic head of the water Wt that flows into the outlet pipe 40 when the pressure inside the outlet pipe 40 becomes negative. As a result, the same effects as the outlet pipe 40 in the First Embodiment can be attained also in the outlet pipe 90. Further, according to the outlet pipe 90 of the present embodiment, it is not necessary to dispose a member to restrain the height of spout of the water Wt inside the outlet pipe 90; thus, it is possible to prevent the flow resistance in the outlet pipe 90 from decreasing and to maintain the exhaust performance.

Fourth Embodiment

A muffler in the Fourth Embodiment is different from the main muffler 10 in the First Embodiment in structures of the outlet pipe. Thus, in the present embodiment, configurations the same as the First Embodiment will be marked with the same reference numerals to omit explanations, and the structures of the outlet pipe different from the First Embodiment will be mainly explained.

A main muffler 10 in the present embodiment is provided with the inlet pipe 15, the outer shell 20, and an outlet pipe 100 (see FIG. 6A and FIG. 6B).

As illustrated in FIG. 6A and FIG. 6B, the outlet pipe 100 in the present embodiment is provided with a pipe member 102 and a cover member 108. FIG. 6A is a diagram illustrating a main substance of an invention in the present embodiment likewise FIG. 3A referenced in the First Embodiment.

The pipe member 102 is a member formed into a cylindrical shape containing a pair of open end-parts. One of the pair of open end-parts of the pipe member 102 (hereinafter referred to as open-end to atmosphere) is coupled to the tail pipe that guides the exhaust gases to the atmosphere outside the vehicle. An end part, opposite the open-end to atmosphere, of the pipe member 102 is disposed to the first expansion chamber Sp1 of the outer shell 20 to function as the exhaust-gas inlet end EE.

The pipe member 102 is provided with multiple vent holes 104 that pass through the outer surface and the inner surface thereof along the outer circumference. Eight vent holes 104 are arranged in the present embodiment.

The cover member 108 is a member to cover a designated vent hole 106 among the vent holes 104. The cover member 108 in the present embodiment is a belt-like plate member that forms an arc along the circumferential direction of the pipe member 102. The cover member 108 is fixed inside the pipe member 102 so as to retain a space from the inner surface of the pipe member 102 and to cover the designated vent hole 106.

The designated vent hole 106 mentioned here is at least one vent hole 104 that faces against the bottom surface 36 of the outer shell 20.

In other words, the cover member 108 functions as the restraining mechanism in the present embodiment.

Effects of Fourth Embodiment

The same effects as the outlet pipe 40 in the First Embodiment can be attained by the outlet pipe 100 in the present embodiment.

Fifth Embodiment

A main muffler in the Fifth Embodiment is different from the main muffler 10 in the Fourth Embodiment in configurations of the cover member. Thus, in the present embodiment, configurations the same as the Fourth Embodiment will be marked with the same reference numerals to omit explanations, and the configurations of the cover member different from the Fourth Embodiment will be mainly explained.

As illustrated in FIG. 7A and FIG. 7B, the outlet pipe 100 is provided with the pipe member 102 and a cover member 110. FIG. 7A is a diagram illustrating a main substance of an invention in the present embodiment likewise FIG. 3A referenced in the First Embodiment.

The cover member 110 is a member to cover the designated vent hole 106 from inside of the pipe member 102, and is made of a material permeable to air and water. The cover member 110 is a member that forms an arc along the circumferential direction of the pipe member 102.

The cover member 110 is fixed inside the pipe member 102 so as to retain a space from the inner surface of the pipe member 102, and to cover the designated vent hole 106.

Permeability to water mentioned here is a property that allows liquids such as water to pass through. Although the cover member 110 that is made of the material permeable to water does allow liquids such as water to pass through, the permeability becomes lower, a force of water spouted inside the pipe member 102 becomes weaker, and the height of the elevation head becomes lower compared to a state in which the cover member 110 is not present.

In other words, the cover member 110 functions as the restraining mechanism in the present embodiment.

Effects of Fifth Embodiment

Thus, the same effects as the outlet pipe 40 in the First Embodiment can be attained by the cover member 110 in the present embodiment.

Since the cover member 110 is permeable to air, it is possible to prevent the flow resistance inside the pipe member 102 from decreasing.

Other Embodiments

Although the embodiments of the present invention are explained hereinabove, the present invention is not limited to the above embodiments and can be achieved in various modes within a scope of the substance of the present invention.

For example, although the outlet pipes 40, 70, 90, and 100 in the above embodiments are formed into a cylindrical shape, a shape of the outlet pipes 40, 70, 90, and 100 does not have to be cylindrical as long as it is tubular. Further, although the outlet pipes 40, 70, 90, and 100 in the above embodiments are linearly formed into a straight pipe as a whole, a shape of the outlet pipes 40, 70, 90, and 100 does not have to be the straight pipe and may be a curved shape pipe and a U-shaped pipe, for example.

Although the position of the outlet end OE of the inlet pipe 15 is set in the third expansion chamber Sp3 in the above embodiments, a position of the outlet end OE may be in the second expansion chamber Sp2 or in the first expansion chamber Sp1. Although the position of the exhaust-gas inlet end EE of the outlet pipe 40 is set in the first expansion chamber Sp1 in the above embodiments, a position of the exhaust-gas inlet end EE is not limited thereto and may be in the second expansion chamber Sp2 or in the third expansion chamber Sp3, for example.

Although the outer shell 20 is partitioned into three expansion chambers in the above embodiments, a structure of the outer shell 20 is not limited thereto and may be a structure with two partitioned expansion chambers, a structure with four or more partitioned expansion chambers, or a structure having one space without being partitioned.

In addition, although the exhaust system 1 provided with the main muffler 10, to which the present invention is applied, is configured as the dual-exhaust system in the above embodiments, the exhaust system provided with the main muffler 10, to which the present invention is applied, is not limited to the dual-exhaust system. For example, the exhaust system provided with the main muffler 10, to which the present invention is applied, may be an exhaust system containing at least one catalyst converter 3, at least one sub-muffler 5, at least one main muffler 10, and multiple exhaust pipes 7.

The exhaust system provided with the main muffler 10, to which one aspect of the present invention is applied, also does not have to contain at least one of the catalyst converter 3 or the sub-muffler 5.

On the other hand, although an object, to which the present invention is applied, is the main muffler 10 in the above embodiments, an object, to which the present invention is applied, is not limited thereto and may be the sub-muffler 5, for example.

Although the outlet pipe 70 in the Second Embodiment is formed into the double-tube wherein the contracted-diameter part 76 of the first pipe 72 is disposed inside the second pipe 78 at least at a part where the vent holes 80 are arranged, a structure of the outlet pipe 70 in the Second Embodiment is not limited thereto. The outlet pipe may be formed into a double-tube wherein the second pipe 78 is disposed inside the first pipe 72. In this state, the vent holes 80 have to be drilled in the first pipe 72 along the outer circumference of the first pipe 72, and the contracted-diameter part 76 has to be disposed to the second pipe 78.

In addition, the first pipe 42 itself in the First Embodiment and the contracted-diameter part 76 of the first pipe 72 in the Second Embodiment may be made of a material permeable to air and water.

Although the cover member 110 in the above Fifth Embodiment is disposed inside the pipe member 102 so as to cover the designated vent hole 106 from inside of the pipe member 102, a position of the cover member 110 is not limited thereto; the cover member 110 may be disposed so as to cover the designated vent hole 106 from outside of the pipe member 102 as illustrated in FIG. 10A and FIG. 10B. In other words, in the present invention, the cover member 110 may be disposed to cover the designated vent hole 106 from outside of the outlet pipe 100 if the cover member 110 is made of an air-permeable material.

Although FIG. 2B, FIG. 3B, FIG. 4B, FIG. 5B, FIG. 6B, and FIG. 7B referenced in the above embodiments illustrate the surface of the water Wt pooled inside the outer shell 20 as attaching the outer circumference of the outlet pipe, the surface of the water Wt pooled inside the outer shell 20 may be inside the outlet pipe (closer to the inner side of the outlet pipe than the designated vent hole). The above mentioned functions and effects can be attained by such case according to the muffler in the above embodiments.

The invention claimed is:

1. A muffler comprising:
    an outer shell configured to receive exhaust gases from an internal combustion engine;
    an outlet pipe formed into a tubular shape comprising a pair of open end-parts as well as at least one vent hole that passes through an outer surface and an inner surface thereof, wherein one of the pair of open end-parts and the vent hole are arranged inside the outer shell so as to guide the exhaust gases in the outer shell to the atmosphere; and
    a restraining mechanism that restrains a height of spout of a liquid that flows inside the outlet pipe through a designated vent hole, the designated vent hole is at least one vent hole facing against a bottom surface of the outer shell among the at least one vent hole the outlet pipe comprises;
    wherein the restraining mechanism comprises a cover member; and
    wherein the cover member is a member made of an air-permeable material.
2. The muffler according to claim 1, wherein the cover member is disposed inside the outlet pipe and covers the designated vent hole.
3. The muffler according to claim 2, wherein the cover member is a pipe that is inserted inside the outlet pipe.
4. The muffler according to claim 2, wherein the cover member is a member formed into a plate-like shape and disposed inside the outlet pipe.
5. The muffler according to claim 1, wherein the restraining mechanism comprises a piece member protruding from a surrounding edge of the designated vent hole so as to cover each designated vent hole from outside of the outlet pipe.
6. The muffler according to claim 1, wherein the cover member is configured to cover the designated vent hole from outside of the outlet pipe.

* * * * *